(12) United States Patent
Tsuchida (10) Patent No.: US 6,567,201 B1
(45) Date of Patent: May 20, 2003

(54) OPTICAL SCANNER

(75) Inventor: Takeshi Tsuchida, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,853

(22) Filed: May 11, 2000

(30) Foreign Application Priority Data

May 11, 1999 (JP) .............................. 11-129364
May 9, 2000 (JP) ....................... 2000-135334

(51) Int. Cl.$^7$ .............................................. G02B 26/08
(52) U.S. Cl. ....................... 359/204; 359/212; 347/242
(58) Field of Search ................................ 359/204, 811, 359/813, 815, 819, 618, 639, 196–198, 212–219; 347/233, 238, 242–244

(56) References Cited

U.S. PATENT DOCUMENTS 5,999,345 A * 12/1999 Nakajima et al. ........... 359/821

* cited by examiner

Primary Examiner—James Phan
(74) Attorney, Agent, or Firm—Fitzpatrick, Cella, Harper & Scinto (57) ABSTRACT

An optical scanner comprises a plurality of light sources, a deflection/scan means for deflecting light beams emitted from the light sources and causing them to scan, and an imaging optical system for focussing light beams coming from the deflection/scan means on an imaging plane. The plurality of light sources are secured by a plurality of light source holders which are by turn secured on a lateral wall of an optical cabinet accommodating the light sources and the deflection/scan means. One or more of the light source holders secure two light sources and are rotatably secured on the lateral wall so that the vertical distance separating the respective light beams emitted from the two light sources can be regulated.

14 Claims, 6 Drawing Sheets

FIG. 3B $d_1 = d_0 \cos\theta$

OPTICAL SCANNER

BACKGROUND OF THE INVENTION

1. Field of the Invention

This invention relates to an optical scanner to be used for an image-forming apparatus such as laser beam printer or laser facsimile machine.

2. Related Background Art

Optical scanners to be used for image-forming apparatus are adapted to reflect and deflect a light beam such as a laser beam by means of a rotary polygon mirror rotating at high speed so as to make a scanning light beam. The obtained scanning light beam is focussed on a photosensitive member arranged on a rotary drum to form an electrostatic latent image there. Then, the electrostatic latent image is turned into a visible toner image by means of a developing machine, which toner image is then transferred onto a recording medium such as a sheet of recording paper. Thereafter, the toner on the recording medium is heated and fixed to complete the printing process.

Figure 1:
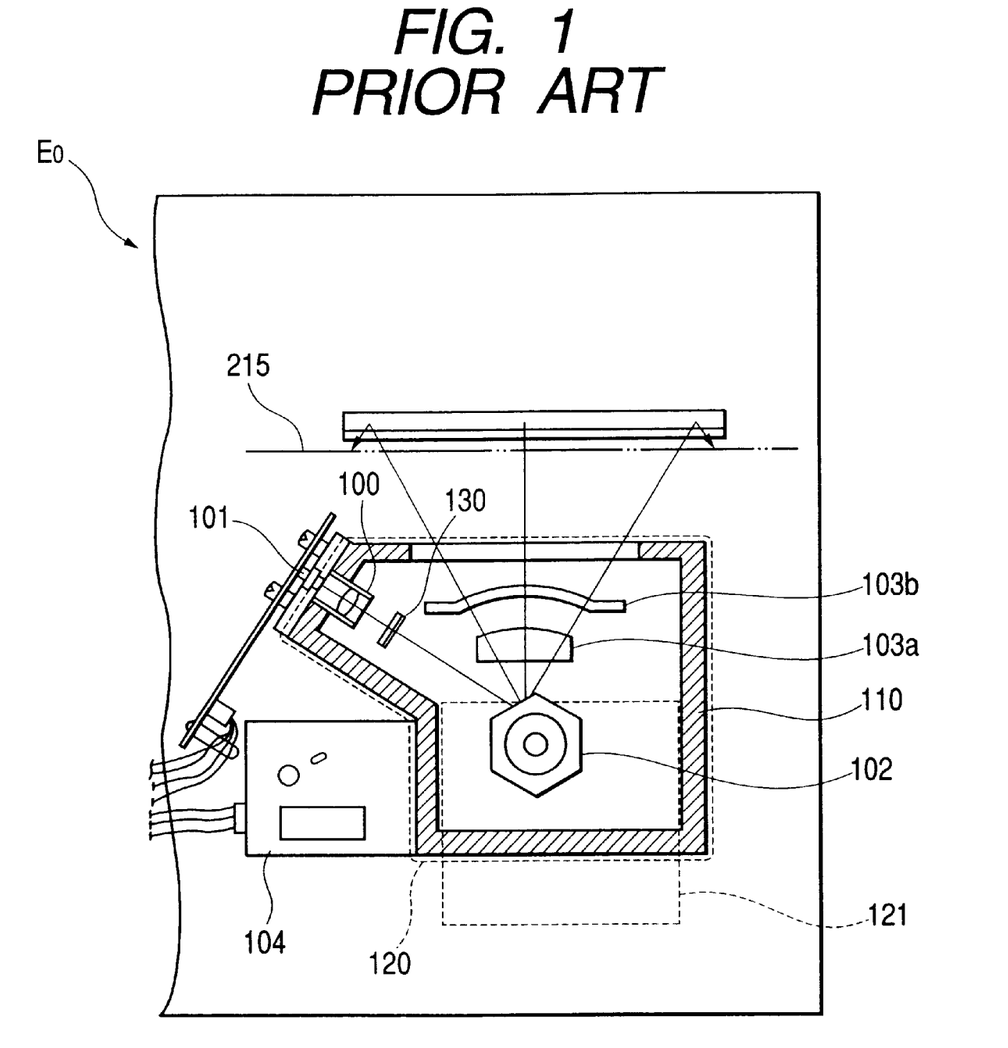
FIG. 1 is a schematic plan view of a known optical scanner.

FIG. 1 of the accompanying drawings schematically illustrates a known typical optical scanner $E_o$. Referring to FIG. 1, the laser beam (light beam) emitted from a semiconductor laser 101 is collimated in a lens barrel 100 and then converged to a linear light beam by means of a cylindrical lens 130. Then, the light beam is deflected by a rotary polygon mirror 102 to scan in a predetermined direction (main-scanning direction) that is perpendicular to the axis of rotation of the polygon mirror and subsequently focussed on a photosensitive member 215 arranged on a rotary drum by means of imaging lenses 103a and 103b. As the light beam striking the photosensitive member 215 is made to scan in the main-scanning direction by the rotation of the rotary polygon mirror 102 and also in the sub-scanning direction by the rotation of the rotary drum, it forms an electrostatic latent image on the photosensitive member.

As the above-described scanning operation for writing image information on the photosensitive member 215 of the rotary drum is repeated, there can arise a problem that the starting point of the writing cycle may be displaced form cycle to cycle due to possible division errors of the reflecting planes of the rotary polygon mirror 102. To avoid this problem, the scanning light beam coming form the rotary polygon mirror 102 is reflected by a BD mirror and led into a BD sensor when the bet gets to the end of the plane being scanned. Then, the controller of the BD sensor transforms the introduced light beam into a scan start signal. The semiconductor laser 101 is so arranged that it starts another write modulation cycle upon receiving the scan start signal.

The imaging lenses 103a and 103b are a spherical lens and a toric lens and have a so-called fθ function of transforming the scanning light beam made to move at a constant angular velocity by the rotary polygon mirror 102 into a scanning light beam moving at a constant velocity in the main-scanning direction on the rotary drum. The rotary polygon mirror 102, the motor for driving the polygon mirror 102, the imaging lenses 103a and 103b are contained in an optical cabinet 110 whose top opening is hermetically sealed by means of a lid member 120 having a radiator panel 121. In FIG. 1, the radiator panel 121 and the lid member 120 are indicated by broken lines to show their positions.

As a result of the technological development in recent years, image-forming apparatus are made to operate at high speed to produce high density images. However, this technological trend requires the rotary polygon mirror to operate with a large number of revolutions per unit time.

On the other hand, as the rotary polygon mirror is driven to rotate at high speed, there arises problems including those of vibrations, noises and heat generated particularly by the bearing and the motor of the rotary polygon mirror. The noises generated by the rotary polygon mirror and the motor can end up with abnormal vibratory sounds. Some known optical scanners are provided in the inside thereof with a noise absorber to minimize the noise problem. The heat generated by the motor can by turn significantly raise the temperature of the optical cabinet to consequently degrade the performance of the motor and that of the optical components housed in the optical cabinet. Although the heat problem may be partly dissolved by arranging radiator fins and/or a heat exchanger in the inside, such an arrangement can greatly increase the dimensions of the apparatus and raise the assembling cost.

An effective way of alleviating the noise problem and the vibration problem of the rotary polygon mirror is to reduce the number of revolutions per unit time of the rotary polygon mirror. Meanwhile, so-called multi-beam deflection scanners adapted to use a plurality of light sources and hence so many light beams simultaneously are known. Such scanners are designed to produce high density images at high speed if the rotary polygon mirror is driven with a relatively small number of revolutions per unit time. If, for instance, two light beams are used, the photosensitive member of the rotary drum is exposed to two light beams simultaneously. Therefore, the time required for the photosensitive member to be fully exposed to light can be reduced to a half of the time required for the exposure process of the photosensitive member using a single light beam. Similarly, if four light beams are used, the number of revolutions per unit time of the rotary polygon mirror can be reduced to a quarter of that of the rotary polygon mirror using a single light beam.

Thus, the use of a plurality of light sources is effective to avoid the problems arising form the-high speed operation of the rotary polygon mirror and including those of vibrations, noise and heat. However, with the known technology, a plurality of light sources are arranged independently in the optical cabinet so that each of them requires a cumbersome operation of aligning the optical axis and securing it to the cabinet by means of screws. Therefore, the use of a plurality of light sources inevitably entails an increased number of parts to be assembled. Additionally, each of the light sources requires a considerable space for accommodating the screws securing it to the cabinet to make the latter dimensionally remarkable.

Then, the light beams emitted from the plurality of light sources are deflected by the rotary polygon mirror to scan the photosensitive member in the main-scanning direction with regular intervals separating them. As a result, the photosensitive member is exposed to light.

In order for any adjacently located ones of the plurality of light beams to be separated from each other accurately by a predetermined distance, all the light sources have to be accurately positioned in and secured to the optical cabinet. Then, positioning the light source accurately is a painstaking operation and requires a large optical cabinet.

More specifically, in order to realize a pixel density of 600 dpi, for instance, the intervals separating the scanning lines on the photosensitive member have to be regulated so as to be equal to 42.3 µm. Then, the operation of aligning the optical axis of each of the light sources is time consuming.

Thus, there is a demand for an optical scanner that provides an improved efficiency for assembling.

SUMMARY OF THE INVENTION

In view of the above identified problems of the prior art, it is therefore an object of the present invention to provide an optical scanner designed to comprise a plurality of light sources for the purpose of high speed and high density printing that allows a simplified operation for securing the light sources in position and requires only a limited space for the light sources to reduce the size of the optical cabinet and the cost of assembling it.

Another object of the present invention is to provide an optical scanner comprising a plurality of light sources that are unitized with respective collimator lenses to allow a simplified operation for securing the light source units to the optical cabinet and the use of only a limited space to accommodate the light source units.

According to the invention, the above objects and other objects are achieved by providing an optical scanner comprising a plurality of light sources, a plurality of light source holders for securing the light sources, a deflection/scan means for deflecting the light beams emitted from the light sources and causing them to scan, a cabinet for accommodating the light sources and the deflection/scan means and an imaging optical system for focussing the light beams coming from the deflection/scan means on an imaging plane, one or more than one light source holders being adapted to secure two light sources.

In another aspect of the invention, there is also provided an optical scanner comprising a light source device having a plurality of light source units, a deflection/scan means for deflecting the light beams emitted from the light source units and causing them to scan, a cabinet for supporting the light source device and the deflection/scan means and an imaging optical system for focussing the light beams coming from the deflection/scan means on an imaging plane, the light source device having a unitizing means for unitizing every two of the plurality of light source units as sub-units and a securing means for securing the sub-units to the cabinet independently.

Preferably, the securing means has a rotary angle regulating means for rotating each of the sub-units relative to the cabinet.

Preferably, each of the sub-units is made rotatable around one of the paired light source units.

Preferably, the securing means has a position regulating means for regulating the intervals separating the sub-units.

Preferably, the light source device has a light path regulating means for making the angles of incidence of all the light beams equal relative to the deflection/scan means.

If each light source unit adapted to emit a light beam is secured to an optical cabinet independently, the cabinet requires a large space for securing all the light source units on a one by one basis. According to the invention, every two of the light source units are paired and unitized as sub-unit to produce two or more than two sub-units, each being adapted to emit two light beams, and the sub-units are secured to the cabinet to reduce the amount of the overall securing operation and also the space required for securing them to the cabinet. Additionally, the intervals separating the optical axes of the light beams and hence the scanning lines of the light beams on the imaging plane can be regulated by regulating the rotary angle of each of the sub-units independently and/or by regulating the intervals of the sub-units. As a result, all the intervals separating the scanning lines can be made to accurately agree with the designed value. The light sources, not unitized into light source units, may also be arranged in a similar manner to achieve the same result.

BRIEF DESCRIPTION OF THE DRAWINGS

FIGS. 2A and 2B are schematic illustrations of a first embodiment of optical scanner according to the invention, of which

DESCRIPTION OF THE PREFERRED EMBODIMENTS

An optical scanner according to the invention is a so-called multi-beam type optical scanner comprising a plurality of light sources, two of which are secured to a single light source holder. The optical scanner has a plurality of such light source holders.

Thus, an optical scanner according to the invention comprises at least four light sources and is hence totally different from any optical scanners comprising only two light sources.

Additionally, an optical scanner according to the invention is so designed that the at least four light beams emitted from the respective light sources can rigorously maintain the assigned intervals that separate them from each other.

An experiment as described below was conducted to complete the present invention.

In the experiment, a total of four light sources were accurately positioned on a single member and rigidly secured to it.

When rigidly securing four light sources to a single member on a one by one basis, up to two of them could be accurately arranged in position without difficulty. However, in the course of trying to arrange a third light source accurately in position on the member to provide predetermined intervals separating the three light source before rigidly fitting it to the member, it became apparent that the operation was a time-consuming one because the distance separating the first two light sources had to be rigorously observed for placing the third light source accurately in position.

Additionally, for rigidly securing the fourth light source to the member, the right position of the light source had to be located accurately on the basis of the intervals separating the three light sources that had already been secured to the member and then the last light source had to be rigidly fitted to the member. Thus, this operation was more time-consuming than that of securing the third light source to the member and therefore the total period of time consumed for the entire process was enormous.

The present invention was achieved on the basis of the above described preliminary experiment. According to the invention, four light sources can be placed accurately in position.

In an optical scanner according to the invention, the intervals separating the light beams scanning a photosensitive member can be rigorously maintained to the designed values with a limit of error of ±2 μm in the sub-scanning direction.

If necessary, an optical scanner according to the invention can be made to comprise more than four light sources. An optical scanner according to the invention may comprise one or more than one members for holding two light sources and/or one or more than one members for holding a single light source.

First Embodiment

Now, the first embodiment of the invention will be described below by referring to the accompanying drawings.

Figure 2A:
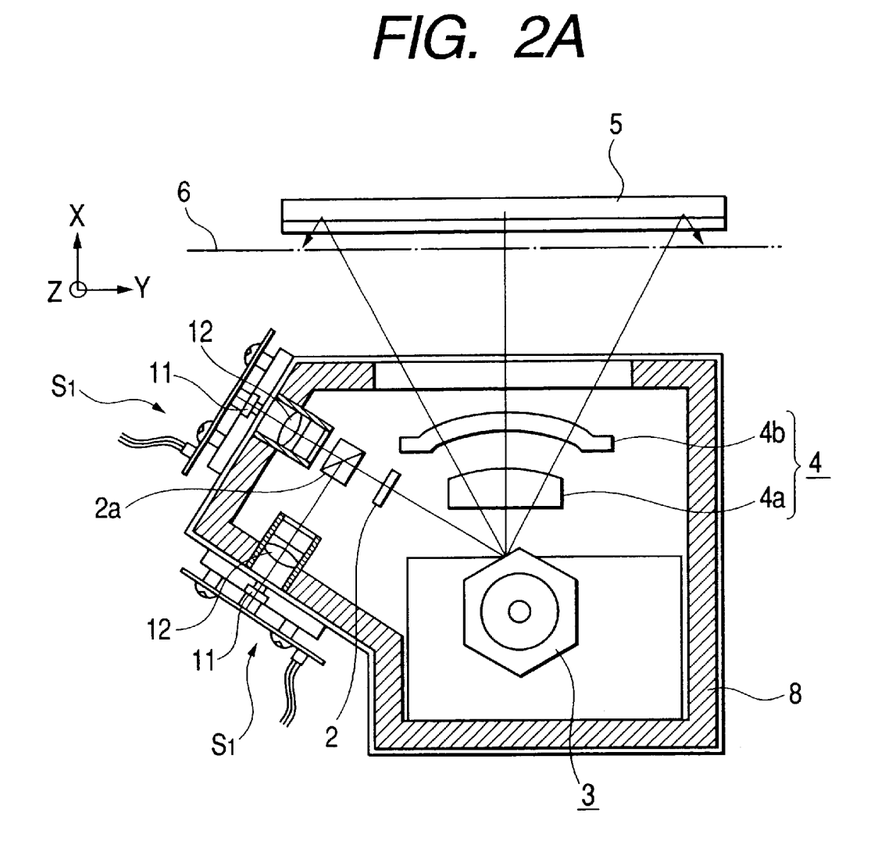
FIG. 2A is a schematic plan view and FIG. 2B is a schematic cross sectional view of one of the sub-units of the embodiment taken along the sub-scanning direction (the Z-axis).

FIG. 2A is a schematic plan view of the first embodiment, showing the positional relationship of the components in the optical cabinet. It contains a light source device having a pair of sub-units S1, each of which is obtained by unitizing a pair of light source units, each including a semiconductor laser 11 and a collimator lens 12. Thus, each of the sub-units S1 emits a pair of laser beams P1 and P2, which are then collimated by the respective collimator lenses 12 and strike one of the reflection planes of rotary polygon mirror 3, which is a deflection/scan means, by way of an cylindrical lens 2. Then, they are focussed on photosensitive member 6 arranged on a rotary drum by way of an imaging lens system having a focussing lens system 4 and a fold mirror 6.

Figure 2B:
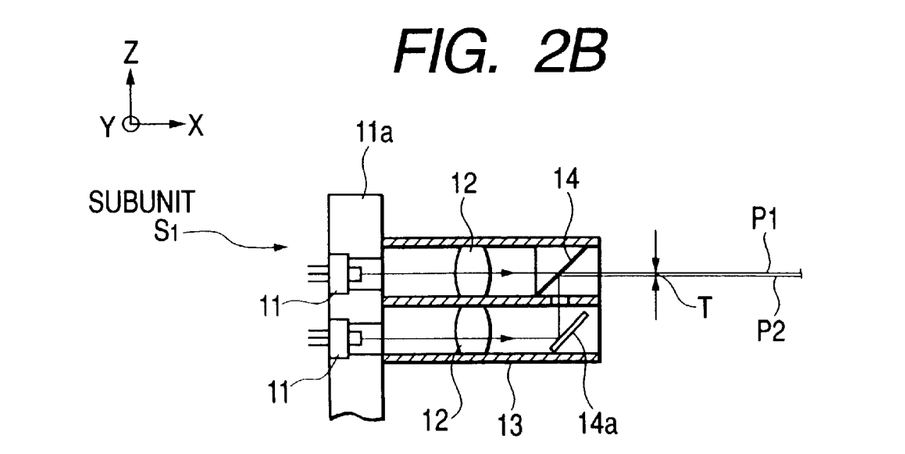

While it may appear in FIG. 2A that a single laser beam source is arranged on a laser holder, actually a pair of laser beam sources are arranged on a same laser holder and only one of them is shown in FIG. 2A as the other one is hidden by the former. FIG. 2B is a schematic cross sectional view of one of the sub-units of the embodiment, showing the two light beam sources.

The two laser beams P1 and P2 emitted from each of the sub-units S1 are then made to strike one of the reflection planes of the rotary polygon mirror 3. Then, the light beams are caused to scan the photosensitive member 6 both in the main-scanning direction (the Y-axis) by the rotation of the rotary polygon mirror 3 and in the sub-scanning direction (the Z-axis) to form an electrostatic latent image on the photosensitive member 6.

The cylindrical lens 2 converges the laser beams P1 and P2 into linear beams before the latter are made to strike one of the reflection planes of the rotary polygon mirror 3 in order to prevent the focussed spots of the light beams on the photosensitive member 6 from being distorted by the rotary motion of the rotary polygon mirror 3. The imaging lens system 4 comprises a spherical lens 4a and a toric lens 4b that operate, like the cylindrical lens, to prevent the focussed spots of the light beams on the photosensitive member 6 from being distorted and cause the spots of the light beams to scan the photosensitive member 6 correctly at a constant rate in the main-scanning direction.

The laser beams P1 and P2 are isolated from each other at the terminal end of the main-scanning plane (XY-plane) by a detection mirror, led to respective light sensors arranged at a side opposite to the main-scanning plane and converted into write start signals by a controller (not shown). The produced signals are then transmitted back to the respective semiconductor lasers 11. Upon receiving the respective write start signals, the two semiconductor lasers 11 of each of the sub-units S1 start an operation of write modulation for the laser beams P1 and P2.

Thus, the write start positions for forming the electrostatic latent image on the photosensitive member 6 of the rotary drum are regulated by controlling the timing of write modulation of the laser beams P1 and P2.

The cylindrical lens 2, the rotary polygon mirror 3 and the imaging lens system 4 are secured to the bottom wall of the optical cabinet 8. After securing the optical components to the optical cabinet 8, each of the sub-units is secured to the lateral walls of the optical cabinet 8 at a right position with a right angle relative to the optical components and the other sub-units. The top opening of the cabinet 8 is then closed by means of a closure (not shown).

As shown in FIG. 2B, each of the sub-units S1 comprises a pair of semiconductor lasers 11 rigidly secured to a laser holder 11a operating as unitizing means. If necessary, a lens barrel may be provided in the sub-unit S1 and made to contain collimator lenses and a beam splitter therein. Then, the two light beams emitted from the respective semiconductor lasers 11 are emitted from the sub-unit S1 after passing through the respective collimator lenses 12 and the beam splitter 14. More specifically, in the lens barrel 13, the light beam P1 emitted from one of the semiconductor lasers 11 of the sub-unit S1 is made to proceed straight through the beam splitter 14, while the light beam P2 emitted from the other semiconductor laser 11 of the sub-unit S1 is reflected by mirror 14A and bent by the beam splitter 14 so that two light beams are emitted from the lens barrel 13 with a predetermined distance T separating them along the Z-axis. The distance T separating the two light beams can be satisfactorily regulated to show a desired value by accurately positioning the semiconductor lasers relative to each other. If necessary, the distance T may be regulated more accurately by deliberately selecting the locations of the collimator lenses and the beam splitter 14.

Thus, the two semiconductor lasers are rigidly secured to the laser holder in the sub-unit S1 to accurately define the distance T separating the laser beams emitted from them. In a similar manner, the two light beams of the other sub-unit S1 are also rigidly secured to the laser holder to accurately define the distance T separating the laser beams emitted from them.

Additionally, a beam splitter 2a is arranged in this embodiment as shown in FIG. 2A. More specifically, the beam splitter 2a is arranged in such a way that the beams emitted from one of the sub-units are bent by it and strike the rotary polygon mirror with an angle of incidence same as the beams emitted from the other sub-unit and made to pass through the beam splitter without being bent.

It may alternatively be so arranged that the laser beams P1 and P2 emitted from the two sub-units respectively strike one of the reflection planes of the rotary polygon mirror 3. Then, however, the beams emitted from one of the sub-units will strike the rotary polygon mirror with an angle of incidence different from that of the beams emitted from the other sub-unit. Then, the angle of deflection of the laser beams P1 and P2 from one of the sub-units produced by the rotary polygon mirror 3 may be smaller than that of the laser beams P1 and P2 from the other sub-unit. Thus, the beam splitter 2a is provided as light path regulating means for bending the laser beams from one of the sub-units S1 so that the laser beams P1 and P2 from the two sub-units S1 may strike one of the reflection planes of the rotary polygon mirror 3 with a same and identical angle of incidence.

Thus, as a result of arranging at least two sub-units, each containing a pair of semiconductor lasers, at least a total of four laser beams are made to scan the photosensitive member simultaneously by the rotary polygon mirror so that a high speed and high density printing operation may be carried out without increasing the number of revolutions per unit time of the rotary polygon mirror.

Now, how the sub-units S1 are secured to the optical cabinet 8 will be described by referring to FIGS. 3A through 3C.

Figure 3A:
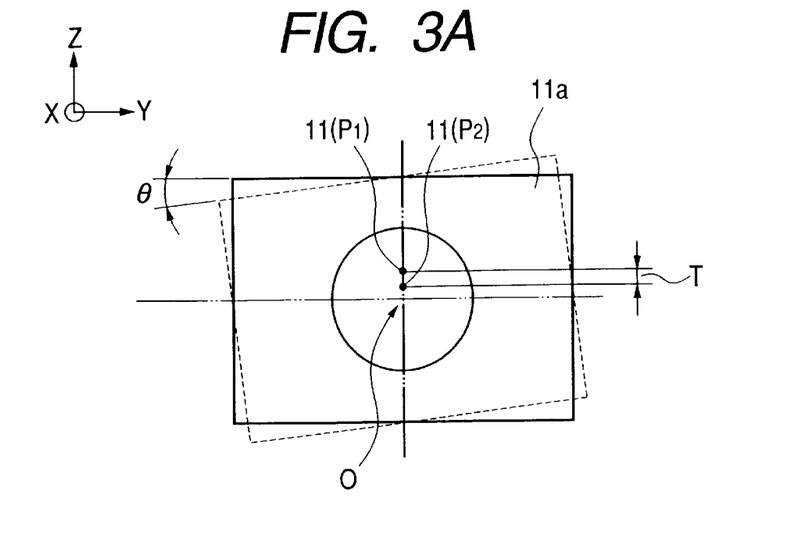
FIGS. 3A, 3B and 3C are schematic illustrations of an operation of regulating the intervals of the optical axes of the light sources by rotating the sub-units.

FIG. 3A schematically illustrates the laser holder tilted by an angle of θ relative to the central axis of the laser holder.

Figure 3B:
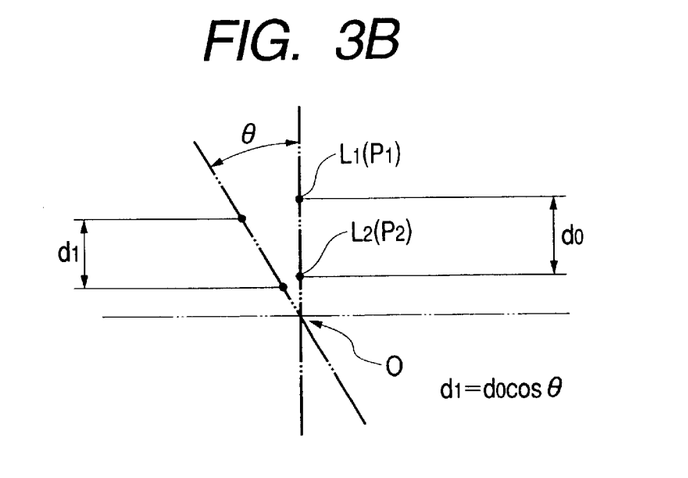

FIG. 3B schematically illustrates the light sources arranged along the central axis, which become inclined when the laser holder is tilted by an angle of θ relative to the central axis.

Figure 3C:
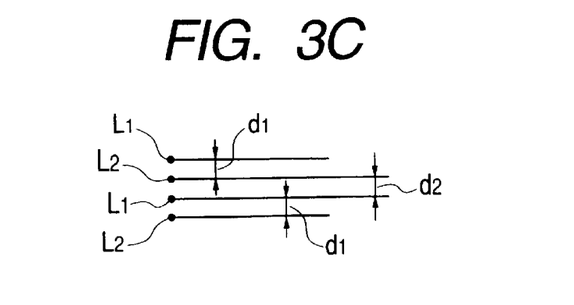

FIG. 3C schematically illustrates the distances separating the four laser beams emitted from the two sub-units.

Firstly, the intervals separating the laser beams P1 and P2 from the sub-units S1 in the sub-scanning direction are regulated by rotating the laser holder 11a around the central axis.

For example, if the distance T separating the two laser beams P1 and P2 emitted from each of the sub-units S1 in FIG. 3A is equal to the distance $d_0$ separating two scanning lines L1 and L2 on the photosensitive member 6 as shown in FIG. 3B, the distance separating the scanning lines is shifted to $d_1$ when the laser holder 11a is rotated by angle θ. Since $d_1 = d_0 \cos\theta$, the distance $d_1$ separating the scanning lines L1 and L2 can be regulated to show a predetermined value when the rotary drum is scanned by the laser beams P1 and P2 from each of the sub-units S1 by selecting an appropriate angle of rotation θ for the sub-unit by means of a rotary angle regulating means arranged in the supporting section rotatably supporting the laser holder 11a of the sub-units S1.

Additionally, if a position regulating means is arranged to regulate the positions of the two sub-units in the sub-scanning direction, the distance $d_2$ between the two pairs of scanning lines produced by the two sub-units S1 can be regulated by selecting an appropriate value for the distance separating the two sub-units S1 in the direction of the Z-axis as shown in FIG. 3C.

The process of regulating the distance $d_2$ to show a predetermined value will be discussed below. The distance $d_2$ can be regulated to show a predetermined value by appropriately selecting the heights of the sub-units that are secured to a lateral wall of the optical cabinet because the reflection planes of the rotary polygon mirror 3 are arranged perpendicularly relative to the bottom wall of the optical cabinet. In other words, the distance $d_2$ separating the laser beams striking the rotary polygon mirror from each of the sub-units has to be regulated in the direction perpendicular to the bottom of the optical cabinet.

In this embodiment, the lateral walls of the optical cabinet are standing perpendicularly relative to the bottom wall of the optical cabinet. Therefore, the heights of the sub-units will be selected along the lateral wall to which they are secured, or in the direction perpendicular to FIG. 3A. If the lateral wall is inclined, the positions at which the sub-units are secured to the lateral wall will be selected along the inclined lateral wall.

In short, the position of at least one of the sub-units has to be selected on the lateral wall of the optical cabinet to which it is secured in such a way that any two adjacently located laser beams are separated by a desired distance in the sub-scanning direction on the photosensitive member.

In this way, the intervals separating the light beams are regulated in such a way that all the scanning lines are accurately arranged with designed intervals on the rotary drum.

After the completion of the operation of regulating the intervals separating the light beams, the sub-units 8 are secured to a lateral wall of the optical cabinet 8 typically by a known means such as screws, an adhesive agent or photosetting resin that is set by ultraviolet rays.

Thus, with this embodiment of the invention, since a plurality of laser beams can be made to scan a photosensitive member simultaneously, a high speed and high density printing operation can be realized without raising the rotation speed of the rotary polygon mirror. Additionally, since every two of the light source units are paired and unitized as sub-unit to produce two or more than two sub-units, each being adapted to emit two light beams, the operation of regulating the intervals of the laser beams and that of securing the light sources to the optical cabinet are remarkably simplified. As a result, the number of assembling steps and also the number of components are reduced to reduce by turn the overall cost. Still additionally, the space required for installing the light sources can also be reduced if compared with the arrangement of securing the light sources separately and independently.

Figure 4:
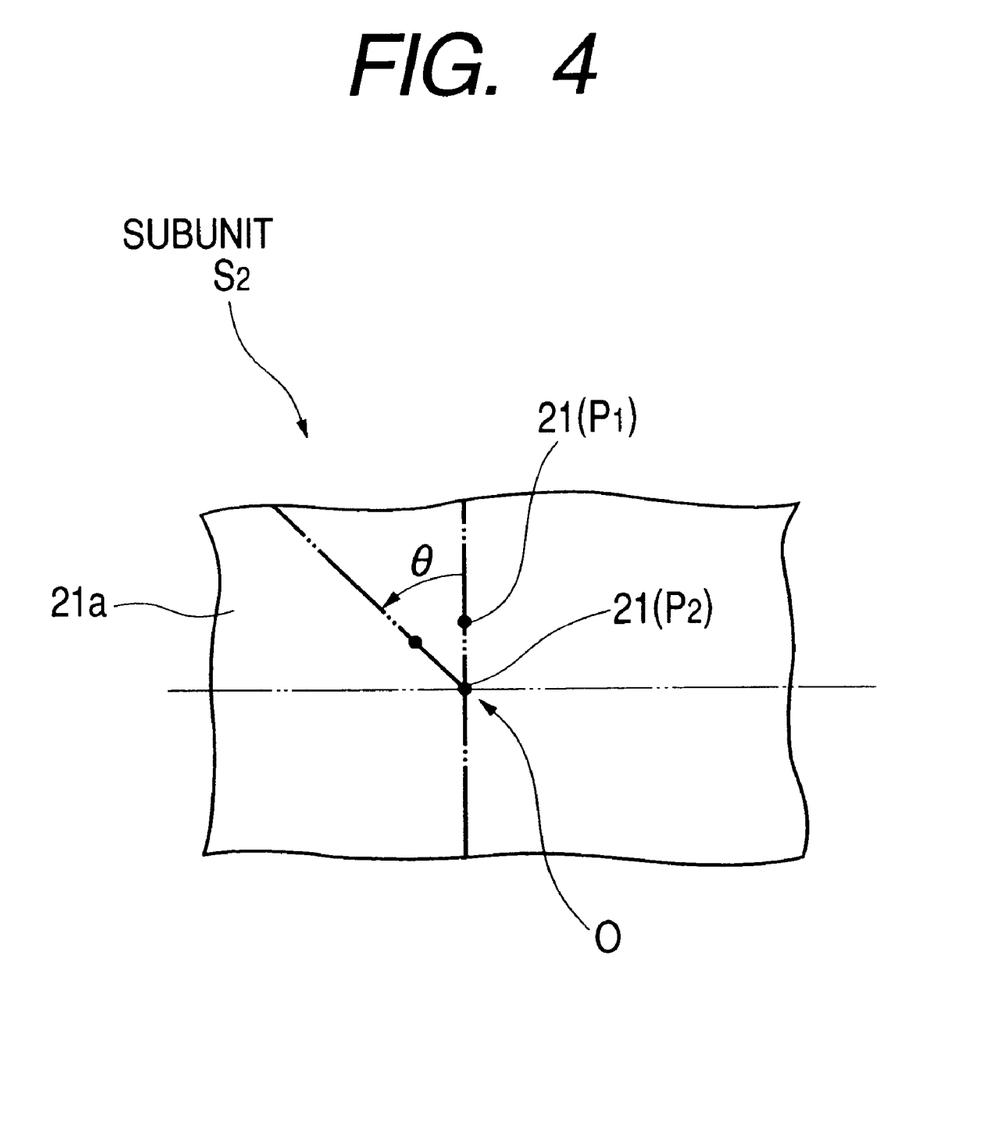
FIG. 4 is a schematic illustration of another operation of regulating the intervals of the optical axes of the light sources, which is a modification to the operation of FIGS. 3A through 3C.

FIG. 4 is a schematic illustration of another operation of regulating the intervals of the optical axes of the light sources in a sub-unit S2, which is a modification to the operation of FIGS. 3A through 3C. Referring to FIG. 4, the light emitting point of the semiconductor laser 21 emitting one of the laser beams, or laser beam P2, is made to agree with the rotation center 0 of the laser holder 21a, which is the counterpart of the laser holder 11a of the above embodiment.

With this arrangement, since the light emitting point P2 of one of the semiconductor lasers is secured, it provides an advantage that only the position of the scanning line of the other laser beam P1 needs to be monitored when regulating the intervals of the laser beams by modifying the angle of rotation θ of the laser holder 21a.

Second Embodiment

Now, the second embodiment of optical scanner according to the invention will be described by referring to FIGS. 5A and 5B. In this embodiment, the laser beams emitted from the respective sub-units are made to strike the rotary polygon mirror by way of respective light paths that are separated from each other.

Figure 5A:
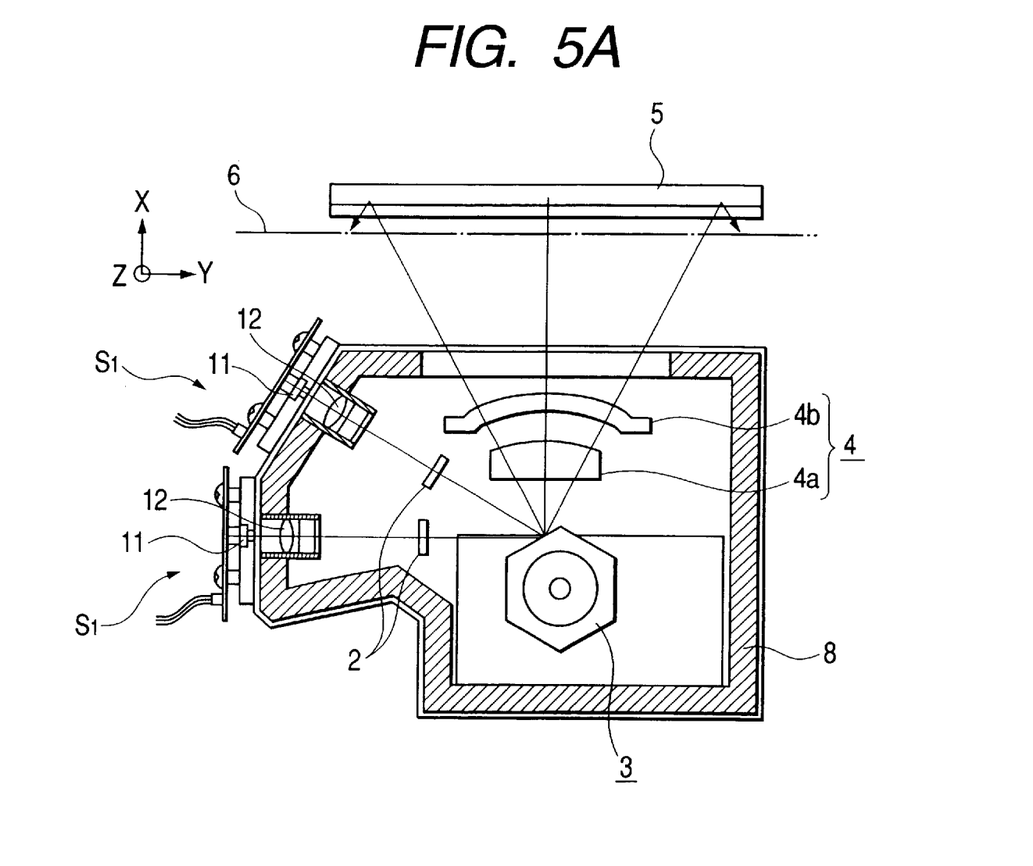
FIGS. 5A and 5B are schematic illustrations of a second embodiment of optical scanner according to the invention.

FIG. 5A is a schematic illustration of the second embodiment of optical scanner, showing the positional arrangement of the components in the optical cabinet. FIG. 5B is a schematic cross sectional view of one of the sub-units of the second embodiment. In FIGS. 5A and 5B, the components same as or similar to those of the first embodiment are denoted respectively by the same reference symbols.

In the embodiment, the sub-units are arranged close to each other and the laser beams emitted from each of the sub-units are focussed on a same position on the rotary polygon mirror. Unlike the first embodiment, the optical cabinet of this embodiment does not contain any beam splitter and, therefore, the light paths of the laser beams emitted from the sub-units differ from sub-unit to sub-unit on the XY-plane. In other words, the laser beams from each of the sub-units are made to directly strike the rotary polygon mirror at a same point due to the absence of beam splitter. Additionally, a cylindrical lens is arranged between each of the sub-units and the rotary polygon mirror.

Figure 5B:
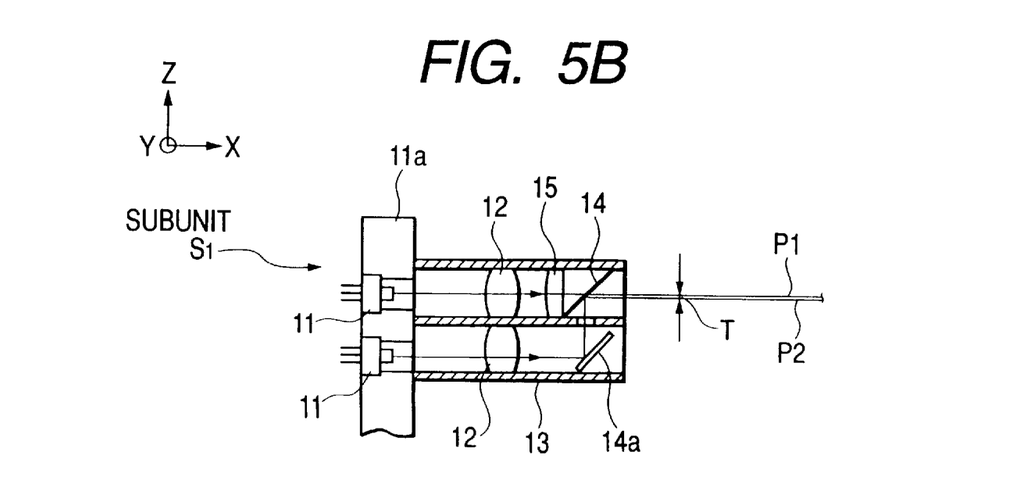

FIG. 5B schematically shows a cross sectional view of one of the sub-units of the second embodiment. As seen from FIG. 5B, the sub-unit of this embodiment is provided with a half-wave ($\lambda/2$) plate 15 arranged across the optical axis of at least one of the semiconductor lasers. The half-wave ($\lambda/2$) plate 15 gives rise to a phase difference of $\lambda/2$ to the incident light beam having a wavelength of $\lambda$.

The distance $d_1$ separating any two adjacently located light beams in a same sub-unit in the direction of the Z-axis can be regulated by tilting the sub-unit by an appropriate angle relative to the optical cabinet as described earlier by referring to the first embodiment.

The distance $d_2$ separating adjacent light beams from the two sub-units in the direction of the Z-axis can be regulated by appropriately selecting at least the height of one of the sub-units relative to the corresponding lateral wall of the optical cabinet and rigidly securing it to the latter also as described earlier by referring to the first embodiment.

In this embodiment, the distance $d_2$ can also be regulated by appropriately selecting at least the position or the angle of one of the cylindrical lenses or the angle of incidence of the laser beams entering the cylindrical lens.

Then, the distance $d_2$ can be regulated after securing the sub-unit corresponding to the selected cylindrical lens to the lateral wall simply by regulating the arrangement of the cylindrical lens. It may be appreciated that the operation of rigidly securing the cylindrical lens to the right position is easier than the operation of rigidly securing the sub-unit to the right position.

Third Embodiment

Figure 6:
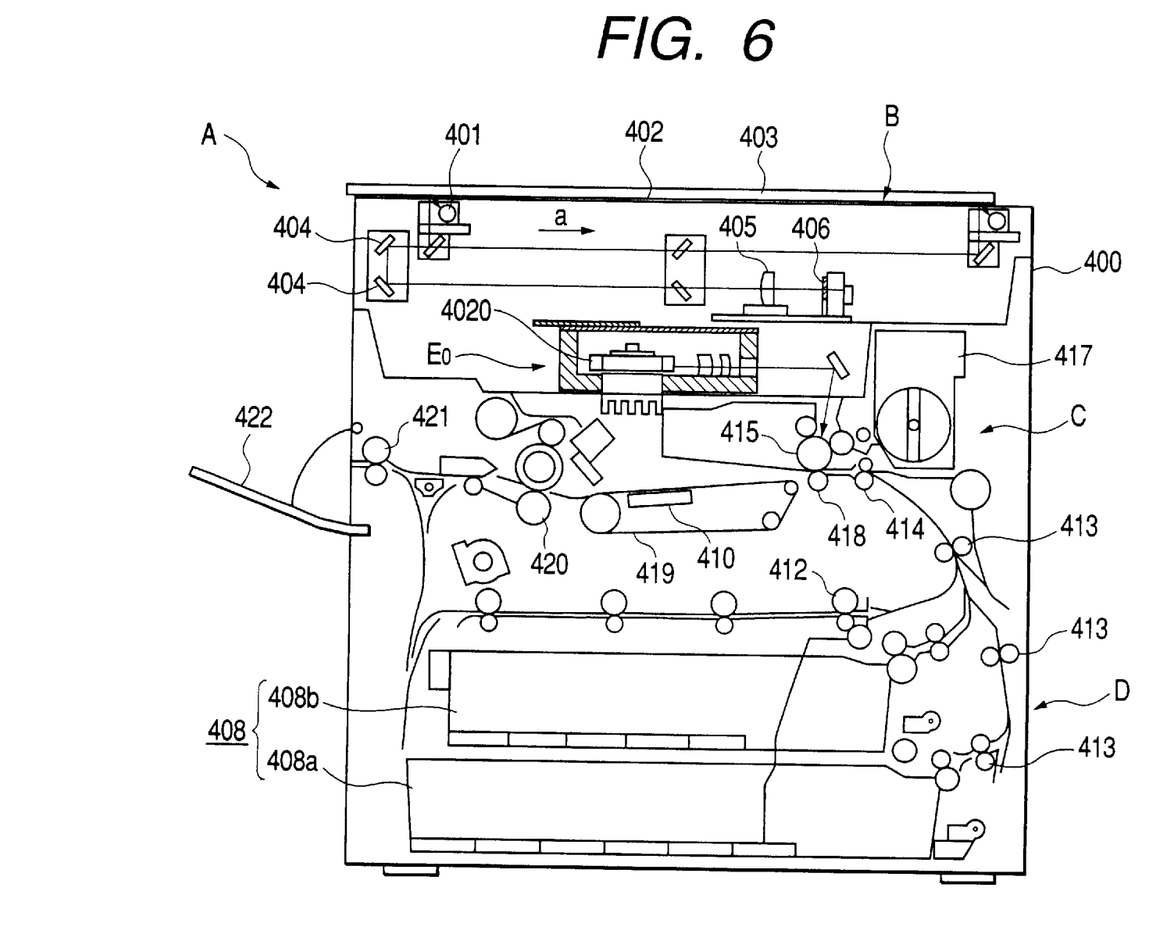
FIG. 6 is a schematic illustration of an image forming apparatus realized by using an optical scanner according to the invention.

FIG. 6 is a schematic illustration of an image forming apparatus realized by using an optical scanner according to the invention, which apparatus is an electrophotographic machine. The image forming apparatus comprises an optical scanner according to the invention, which may be the first embodiment or the second embodiment. The image forming apparatus A comprises an scanner section B arranged at the top thereof to operate as image reading means for reading image information from an original, an image forming section C arranged below the scanner section to operate as image forming means and a sheet feeding device D arranged below the image forming section.

The scanner section B has a a scanning light source 401, a platen glass 402, a pressure plate 403 for pressing the original placed thereunder and adapted to be opened and closed relative to the apparatus main body 400, a couple of mirrors 404, a lens 405, a light receiving element (photoelectric converter) 406 and an image processing section. The original, which may be a page of a book or a sheet of paper, is placed on the platen glass 402 to face downward, pressed downward from behind by the pressure plate 403 and held stationarily to that state. Then, as the read start key is depressed under this condition, the scanning light source 401 emits light beams that scan the platen glass from below in the direction of arrow a to read image information from the original.

The image information obtained by the light beams of the scanning light source 401 is then processed by the image processing section and transformed into an electric signal, which is transmitted to an optical scanner $E_0$. It will be appreciated that the image forming apparatus A operates as copying machine if the optical scanner $E_0$ is used to form an image from the processed signal from the image processing section and as printer if an image is formed from the output signal of the personal computer connected to it. It can also operates as facsimile machine if an image is formed from the signal transmitted from a remote facsimile machine or if it transmits the processed signal to some other remote facsimile machine.

On the other hand, the sheet feeding device D arranged below the image forming section C has a sheet cassette unit 408, or a feed unit, including a lower cassette 408a and an upper cassette 408b. The sheets of paper contained in the sheet cassette unit 408 are sent out on a one by one basis and transferred by a transfer means including transfer rollers 412 and 413 to register rollers 414, which register rollers 414 then forward the sheet to the image forming section C in synchronism with the image forming operation of the image forming section C.

The image forming section C has a photosensitive member 415 arranged on a rotary drum, the optical scanner $E_0$, a developing unit 417 and a transfer corona charger 418. The surface of the photosensitive member 415 that is evenly electrically charged by the corona charger 417 is then scanned by the light beams emitted from the corresponding semiconductor lasers (not shown) and carrying image information by way of the rotary polygon mirror 4020 to from a latent image there, which latent image is developed to a toner image by the developing unit 417 and transferred by the transfer corona charger 418 onto the first side of the sheet that is forwarded by the register rollers 414 in synchronism with the rotary motion of the photosensitive member 415.

In FIG. 6, reference numeral 419 denotes a transfer belt for transferring the sheet that is now carrying the toner image and reference numeral 420 denotes a fixing unit, whereas reference numeral 421 denotes delivery rollers.

Thus, the sheet that is now carrying the toner image is transferred to the fixing unit 420 by the transfer belt 419 that holds the sheet by means of a sheet suction fan 410. The toner image is fixed on the sheet surface by heat and pressure and then the sheet is delivered to the outside by the delivery rollers 421 and received in a tray 422.

An optical scanner according to the invention and described above in detail provides the following advantages.

In an optical scanner according to the invention adapted to use a plurality of light beams in order to accommodate high speed printing and high density printing, the light sources can be secured in position in a simplified operation to reduce the space requirement.

As a result, the optical cabinet can be down-sized to reduce the overall assembling cost. Thus, an image forming apparatus comprising such an optical scanner can also be down-sized and manufactured at low cost, although it is adapted to high speed printing to obtain high quality images.

What is claimed is:

1. An exposure apparatus comprising:
   two light sources for respectively emitting first and second light beams;
   a deflection/scan means for deflecting said light beams and causing them to scan;
   a light path regulating means for regulating said first and second light beams to maintain a small distance therebetween along a light path;
   a cabinet for supporting said deflection/scan means; and a holding member holding said two light sources and said light path regulating means in fixed positions, said holding member being secured rotatably in said cabinet around a rotation axis oriented in the direction of said light path.

2. An exposure apparatus according to claim 1, wherein said holding member is rotatable around one of said two light sources.

3. An exposure apparatus according to claim 2, wherein said exposure apparatus is used for an image forming apparatus for forming images on a recording material.

4. An exposure apparatus according to claim 1, wherein said apparatus comprises a plurality of said holding members, each having two light sources.

5. An exposure apparatus according to claim 4, wherein the plurality of said holding members are arranged such that light beams emitted from light sources provided in other holding members are aligned in order when they are incident on said deflection/scan means.

6. An exposure apparatus according to claim 5, wherein said exposure apparatus is used for an image forming apparatus for forming images on a recording material.

7. An exposure apparatus according to claim 4, wherein said exposure apparatus is used for an image forming apparatus for forming images on a recording material.

8. An exposure apparatus according to claim 1, wherein the position of said light path regulating means is changeable.

9. An exposure apparatus according to claim 8, wherein said exposure apparatus is used for an image forming apparatus for forming images on a recording material.

10. An exposure apparatus according to claim 1, further comprising a collimator lens for collimating a light beam between said mirror or light path regulating means and said light sources.

11. An exposure apparatus according to claim 10, wherein said exposure apparatus is used for an image forming apparatus for forming images on a recording material.

12. An exposure apparatus according to claim 1, further comprising an imaging means for focusing the light beams deflected and caused to scan by said deflection/scan means.

13. An exposure apparatus according to claim 12, wherein said exposure apparatus is used for an image forming apparatus for forming images on a recording material.

14. An exposure apparatus according to claim 1, wherein said exposure apparatus is used for an image forming apparatus for forming images on a recording material.

* * * * *